Aug. 3, 1943.   D. NEILSON   2,325,627
THREAD CUTTING TOOL
Filed Oct. 2, 1941   2 Sheets-Sheet 1
Fig. 1
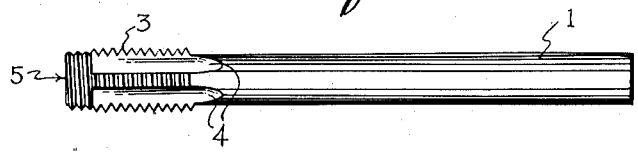
Fig. 2
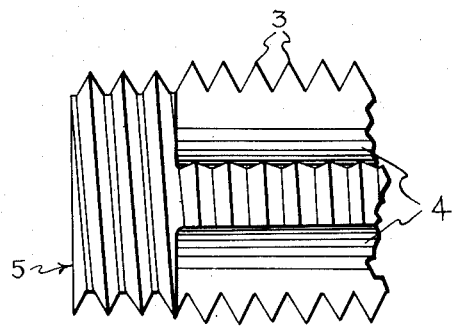
Fig. 3
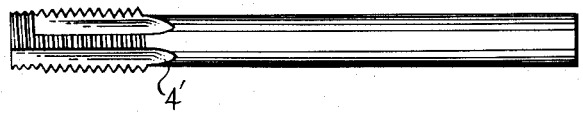
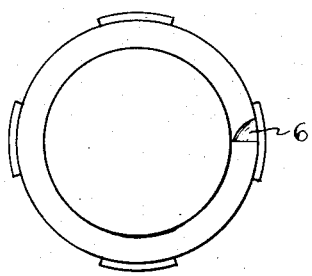   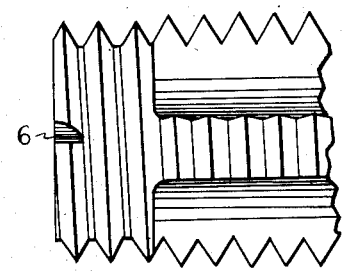   Fig. 4
Fig. 5
Inventor
David Neilson
By J. S. Murray
Attorney Aug. 3, 1943.　　　　　D. NEILSON　　　　　2,325,627
THREAD CUTTING TOOL
Filed Oct. 2, 1941　　　　　2 Sheets-Sheet 2

Inventor
David Neilson
By J. S. Murray
Attorney

Patented Aug. 3, 1943

2,325,627

UNITED STATES PATENT OFFICE 2,325,627

THREAD CUTTING TOOL

David Neilson, Detroit, Mich., assignor of seventy per cent to John E. Castle, Detroit, Mich.

Application October 2, 1941, Serial No. 413,332

8 Claims. (Cl. 10—141)

This invention relates to thread cutting tools and particularly to pilot provisions for such tools.

It is common in cutting screw threads to successively employ two or more taps or dies, the final one applying a smooth finish to the thread roughly formed by preliminary operations. It is for many purposes essential that threads be finished to very precise dimensions and be accurately uniform throughout. As theretofore formed, taps and dies can serve for highly precise and flawless thread cutting only if properly manipulated by a thoroughly skilled mechanic. This, however, involves the cutting of threads individually and at a rate much slower than may be derived from a power driven tool. The use of multiple spindle power driven tools achieves a maximum saving of time and labor, but heretofore multiple spindle drives have not been capable of imparting a precision finish to cut threads.

An object of the invention is to provide a finish cutting tap or die, the leading end of which forms a fully and accurately threaded pilot serving to guide the cutting teeth into proper engagement with the rough-cut threads, assuring perfect axial alignment of the tap or die with said threads and serving to pull the tool forward to progressively advance the cutting edges.

Another object is to so equip a finishing tap or die with a fully threaded pilot portion as to greatly simplify initial engagement of such tool with rough-cut threads, and to adapt the tap or die for a power drive and for a multiple spindle threading operation, without sacrifice of precision.

A further object is to adapt a threaded pilot portion of a finishing tap to accurately predetermine and limit the depth of cut taken by such tool.

A further object is to adapt a finishing tap to be readily engaged in a roughly tapped opening and accurately aligned with such opening, without resorting to bushing plates or other guide fixtures, heretofore largely employed in precision thread cutting.

A further object is to adapt a tap to withdraw chips formed in use of such tap, as it is removed from the tapped opening.

A further object is to equip a finishing tap with a threaded pilot and provide for a ready escape of any particles encountered by the pilot threads or that may enter between such threads and the work.

A further object is to adapt a threaded pilot to be detachably applied to a finishing tap and to positively prevent any such relative rotation of the tap and pilot as would disturb proper continuity of the thread on the tap and pilot.

These and various other objects are attained by the constructions hereinafter described and illustrated in the accompanying drawings, wherein:

Fig. 1 is a side view of a finishing tap equipped with the improved pilot.

Fig. 2 is a greatly enlarged view of the leading end portion of said tap.

Fig. 3 is a view similar to Fig. 1 but showing a modified fluting of the tap.

Fig. 4 is a view similar to Fig. 2 but showing a novel provision for the escape of chips or other particles from the threaded face of the pilot.

Fig. 5 is an end view of the construction shown by Fig. 4.

Figure 7:
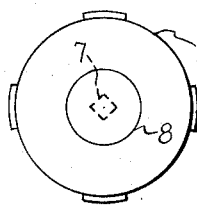
Fig. 7 is a view of the leading end of said pilot.

Considering these views now in greater detail and first discussing Figs. 1 and 2, the reference character 1 designates the usual reduced shank of a finishing tap, any suitable provision being made for securing said shank firmly in the socket of a driving spindle (not shown). Traversing the thread 3 of the tap are the usual flutes 4 interrupting said thread, providing it with numerous cutting edges, and forming recesses to receive the chips of cut metal. Departing materially from general practice as regards finishing and other taps, the convolutions of said thread are of uniform shape and constant diameter throughout the cutting portion of the tool, eliminating the usual chamfer.

In advance of the flutes 4, the tap has a pilot-forming end portion 5 along which the thread 3 is continued, without interruption or change of pitch or formation of cutting edges, substantially to the leading end of the tap. The dimensions of the thread on the pilot are however slightly reduced as compared to those of the thread on the cutting portion, since the pilot thread is required only to closely fit the rough-cut thread of the work, without cutting effect. This reduction of dimensions is somewhat exaggerated in Figs. 1 and 2 to be readily perceptible. The convolutions of the pilot thread adjoining the cutting portion of the tap are of constant diameter and shape, conforming substantially to the rough thread of the work.

The described pilot portion of the tap greatly facilitates proper entry of the finishing tool in a roughly tapped opening, accurately aligns the tap with said opening and loses none of its advantages when the tap is power driven or employed in a multiple spindle operation. The pilot portion further permits of quickly and easily performing a finishing tapping operation with a high degree of precision, such as heretofore entailed slow, careful and highly skilled workmanship.

A further advantage of the improved tap lies in positive prevention of any cutting edge from encountering the bottom of a blind opening and thereby becoming broken or chipped.

In finish tapping a blind hole, it is a further advantage of the described tap that engagement of the pilot portion with the bottom of such hole may be utilized to react on mechanism driving the tap to automatically reverse rotation of said mechanism for purpose of withdrawing the tap.

Also, in tapping such a hole, the axial extent of the pilot can be utilized to definitely limit and predetermine the depth to which the finishing cut will be taken, so that similar finish tapping of a plurality of holes of equal depth may be assured.

In using the described tap, there may be eliminated, if desired, the usual feed screw of a power tapping mechanism, since the thread of the pilot, when engaged with the rough thread of an opening will serve to establish and maintain a proper feed of the tap into the opening. Elimination or non-use of the lead screw permits a power drive mechanism to be applied in tapping threads of diverse pitches, without adjustment.

While use of unthreaded pilots on rotary cutting tools is not uncommon, it is important to note that no such pilot has a practical application to a finish-tapping operation and particularly one entailing a high degree of precision, since the thread of the opening would be more or less damaged and distorted by any pilot failing to fully conform to such thread.

In taking a finishing cut with the improved tap, engagement of the pilot thread with the rough thread of the opening of the work, assures that the finishing cut will remove the same amount of stock at all points of the work, avoiding any possible eccentricity of the finishing cut with respect to the axis established by the roughly cut thread.

Since the flutes 4 terminate at the juncture of the cutting and pilot portions of the tap, it follows that chips may not discharge from the flutes into the opening being finish-tapped as in the case of prior taps, and withdrawal of the tap will remove the chips, leaving a clean opening.

The construction shown in Fig. 3 differs from that of Figs. 1 and 2 only in extending a flute 4' across the pilot to its leading end, thus assuring an escape of any dust, dirt or chips that may enter or be encountered between the pilot thread and work.

Figs. 4 and 5 illustrate a feature whereby dust, dirt or chips may discharge readily from between the pilot thread and work. Thus the pilot is formed with a notch 6 interrupting the second convolution of its thread without disturbing the first convolution, said notch having a curved leading face and a substantially radial trailing face with respect to the direction of entering rotation of the pilot. No cutting effect is derived from the edges of said notch, since the notched threads are proportioned to fit within the rough-cut threads of the work.

Figure 6:
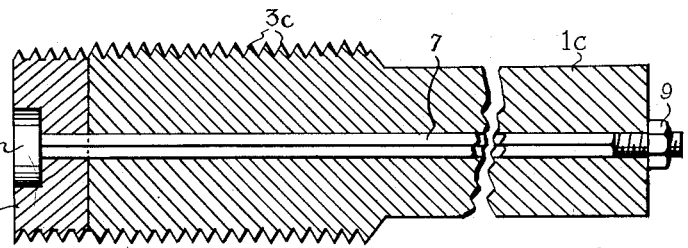
Fig. 6 is an axial sectional view of a finishing tap equipped with a detachable threaded pilot.

Referring now to Figs. 6 and 7, these show a tap identical with that first described as regards its shank 1c, thread 3c and flutes. The threaded pilot 5c is however detachable, being held in place and fully restrained from rotation with respect to the tap by a rod 7 of square or other polygonal cross section closely fitting correspondingly shaped openings in the tap and pilot. At one end said rod is formed with a head 8 set within an opening counterbored in the leading face of the pilot and the other end of said rod is cylindrical and threaded for engagement by a nut 9, seated against the shank extremity. Thus the pilot is held tightly in place with its thread accurately registering with the slightly larger thread of the tap body. A detachable pilot is advantageous in case it is desired to selectively apply to a certain finishing tap, pilots differing as to their axial extent. Thus in finish tapping blind holes, a different pilot could be applied in case it were desired to carry the finish thread deeper in some of such holes than in others. Also the attached pilot permits an application of the invention to certain finishing taps as heretofore made.

Figure 9:
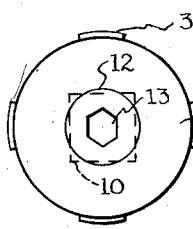
Fig. 9 is a view of the leading end of the pilot of Fig. 8.
Figure 8:
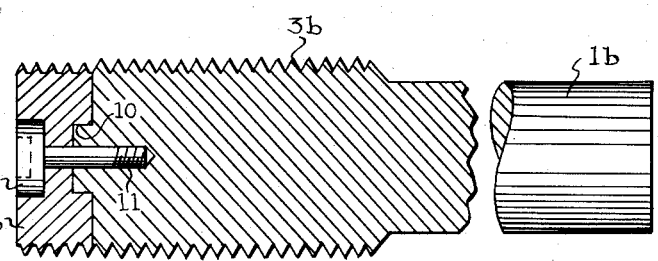
Fig. 8 is a view similar to Fig. 6, but showing an alternative provision for securing a detachable pilot non-rotatively to a tap.

Figs. 8 and 9 disclose a modified provision for rigidly attaching a pilot to a tap. As regards its shank 1b, thread 3b and flutes, the tap corresponds to the construction last described. The threaded pilot 5b is formed with a square or other polygonal socket snugly receiving a locking projection 10 of corresponding shape formed on the leading end of the tap. The pilot is held firmly against the tap and in interlocking engagement with the latter by a stud bolt 11 freely extending axially through the pilot and threaded into the tap, said bolt having a head 12 set into a counterbore in the leading face of the pilot and socketed as indicated at 13 for engagement by an Allen wrench.

Figure 11:
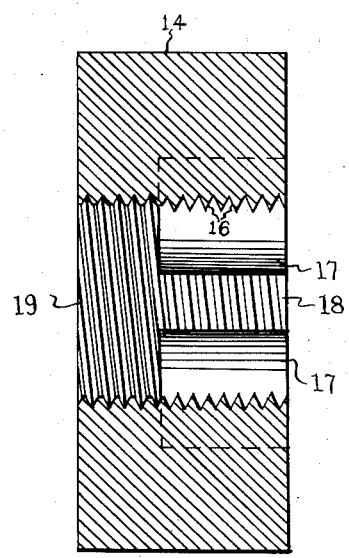
Fig. 11 is a dimetrical sectional view of said die, taken on the line 11—11 of Fig. 10.
Figure 10:
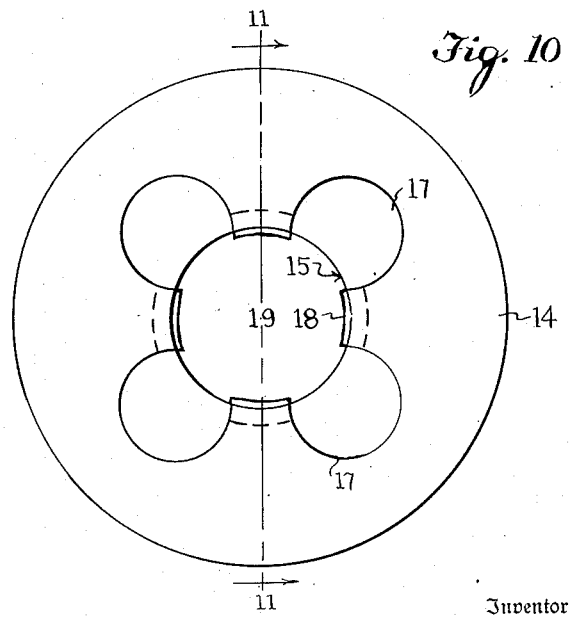
Fig. 10 is an end view of a threading die having the improved pilot feature.

Referring now to the invention as exemplified in Figs. 10 and 11, a circular die 14 is centrally formed with a cylindrical opening 15 extending between opposed faces of the die and formed with a screw thread 16. The wall of said opening is interrupted by a suitable number of smaller, parallel, symmetrically disposed cylindrical openings 17, whereby said wall forms a number of similar lands 18, having cutting edges at their intersections with the openings 17, the latter serving to receive chips. Departing materially from common practice, the openings 17 terminate some distance from the leading face of the die, thus forming a pilot portion 19, whereon the convolutions of the thread 16 extend without interruption. There is effected a slight reduction of the thread 16 in all its dimensions as it traverses the pilot portion 19, and the extent of the cut to be taken by the die is predetermined by the slight excess in dimensions of the cutting portion of the thread over its pilot portion. The pilot portion of the thread has its convolutions identical in diameter and shape, and the continuity of said convolutions avoids necessity for such careful and prolonged manipulation as is entailed in applying ordinary finishing dies.

Stress has been laid on the value of the invention in expediting and facilitating precision tapping and permitting a high degree of precision to be obtained in use of power-driven taps and multiple spindle tapping operations. It is essential to appreciate in such connection that modern engineering requirements entail tapping to decidedly precise limits, measured in some cases to four decimal places. Such requirements are exemplified in U. S. Army and Navy air craft specifications, which group the most precise requirements in classes ranging from 1 to 5 according to the degree of precision required.

While the invention has been disclosed as applied to taps and dies it is to be understood that it is further applicable to chasers and hobs, and any other thread-cutting tool or device.

The invention is presented as including all such modifications and changes as come within the scope of the following claims.

What I claim is:

1. A finish thread cutting tool comprising a cutting portion and a pilot portion and formed with a thread continuously extending on both said portions, said thread being interrupted on the cutting portion to form cutting edges, and extending uninterruptedly on the pilot portion to the leading end of the tool, the root diameter of the thread being substantially constant on both said portions.

2. A finish thread cutting tool comprising a cutting portion and a pilot portion and formed with a thread continuously extending on both said portions, and having its root diameter substantially constant on both said portions, said thread being interrupted on the cutting portion to form cutting edges, and being reduced in size on the pilot portion to predetermine the finishing cut by the excess in size of the cutting thread over the pilot thread.

3. A finish thread cutting tool comprising a cutting portion and a pilot portion and formed with a thread continuously extending on both said portions and having its root diameter substantially constant on both said portions, said tool being formed with a plurality of flutes extending lengthwise of its cutting portion, and interrupting said thread to form cutting edges and further serving to receive chips, a single one of said flutes being extended to the leading end of the tool to afford an escape of chips or other particles from the threaded face of the pilot portion, and the other flutes terminating at the pilot portion.

4. A tool for cutting a finishing thread comprising a cutting portion and a pilot portion and formed with a thread continuously extending on both of said portions, and having its root diameter substantially constant on both said portions, said thread being interrupted on the cutting portion to form cutting edges, and being reduced in size on the pilot portion to fit a rough-cut thread of the work and extending without material interruption on the pilot portion.

5. A thread cutting finishing tap comprising a cutting portion and a pilot portion and formed with a thread continuously extending on both said portions, and having its root diameter substantially constant on both said portions, the cutting portion being fluted to provide the thread with cutting edges and to receive chips cut by such edges, the thread being reduced in cross section on the pilot portion to fit a rough-cut thread of the work, and the flutes terminating at the pilot portion, whereby withdrawal of the tap from an opening will withdraw said chips.

6. A finishing tap having a thread with cutting edges and further equipped with a detachable pilot, the thread of the tap being extended continuously and without material interruption on the pilot substantially to its leading end.

7. The combination with a tap having a thread interrupted to form cutting edges, of a pilot engaging the leading end of the tap and threaded substantially from end to end thereof, the pilot thread forming a continuation of the tap thread, and means for non-rotatively securing the pilot to the tap.

8. The combination with a tap having a thread interrupted to form cutting edges, of a pilot engaging the leading end of the tap and interlocked with the tap to restrain the tap and pilot from relative rotation, and a member disposed at the axis of the tap and pilot and prohibiting their relative rotation, the pilot being threaded substantially from end to end thereof, and its thread forming a continuation of the tap thread.

DAVID NEILSON.